United States Patent
La

(10) Patent No.: US 7,139,763 B1
(45) Date of Patent: Nov. 21, 2006

(54) METHOD AND SYSTEM FOR PROCESSING DATA SELECTED FOR RECORDING TO OPTICAL MEDIA

(75) Inventor: Luke Kien La, Los Angeles, CA (US)

(73) Assignee: Sonic Solutions, Novato, CA (US)

( * ) Notice: Subject to any disclaimer, the term of this patent is extended or adjusted under 35 U.S.C. 154(b) by 545 days.

(21) Appl. No.: 09/967,786

(22) Filed: Sep. 28, 2001

(51) Int. Cl.
G06G 17/30 (2006.01)

(52) U.S. Cl. .................. 707/100; 707/2; 369/47.12; 360/15; 360/55

(58) Field of Classification Search ............... 707/100, 707/205, 200, 2; 360/15, 55, 48; 369/47.12
See application file for complete search history.

(56) References Cited

U.S. PATENT DOCUMENTS

| | | | | | |
|---|---|---|---|---|---|
| 5,119,291 A | * | 6/1992 | Flannagan et al. | ............. | 711/4 |
| 5,360,651 A | * | 11/1994 | Baxter et al. | ............. | 428/64.4 |
| 5,446,857 A | * | 8/1995 | Russ | ............. | 711/100 |
| 5,499,358 A | * | 3/1996 | Nevarez | ............. | 707/101 |
| 5,579,516 A | * | 11/1996 | Van Maren et al. | ............. | 707/1 |
| 5,666,531 A | * | 9/1997 | Martin | ............. | 707/204 |
| 5,832,263 A | * | 11/1998 | Hansen et al. | ............. | 719/322 |
| 5,884,298 A | * | 3/1999 | Smith et al. | ............. | 707/2 |
| 5,940,853 A | * | 8/1999 | Ooi et al. | ............. | 711/111 |
| 6,574,642 B1 | * | 6/2003 | James | ............. | 707/205 |
| 6,785,219 B1 | * | 8/2004 | Sasaki et al. | ............. | 369/275.3 |

* cited by examiner

*Primary Examiner*—Leslie Wong
(74) *Attorney, Agent, or Firm*—Martine Penilla & Gencarella, LLP

(57) ABSTRACT

Methods for processing data to be recorded to optical media are provided. In one example, a method includes receiving a request to record data to optical media. The method then maps a source path for the data from a root directory through any intervening parent directories to the file location of the data, and saves the source path in a database. When saving the source path to the database, node identifiers are used to represent individual nodes of the source path with corresponding keys to the node identifiers saved in a path table. The method further provides for the complete source path for each file of the data to be recorded to be retrieved in one step when processing and recording the data.

12 Claims, 4 Drawing Sheets

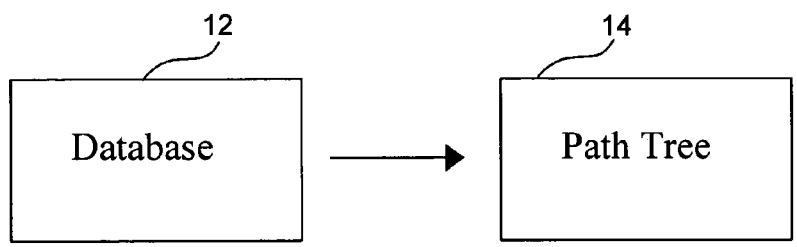
FIG. 1A
(Prior Art)
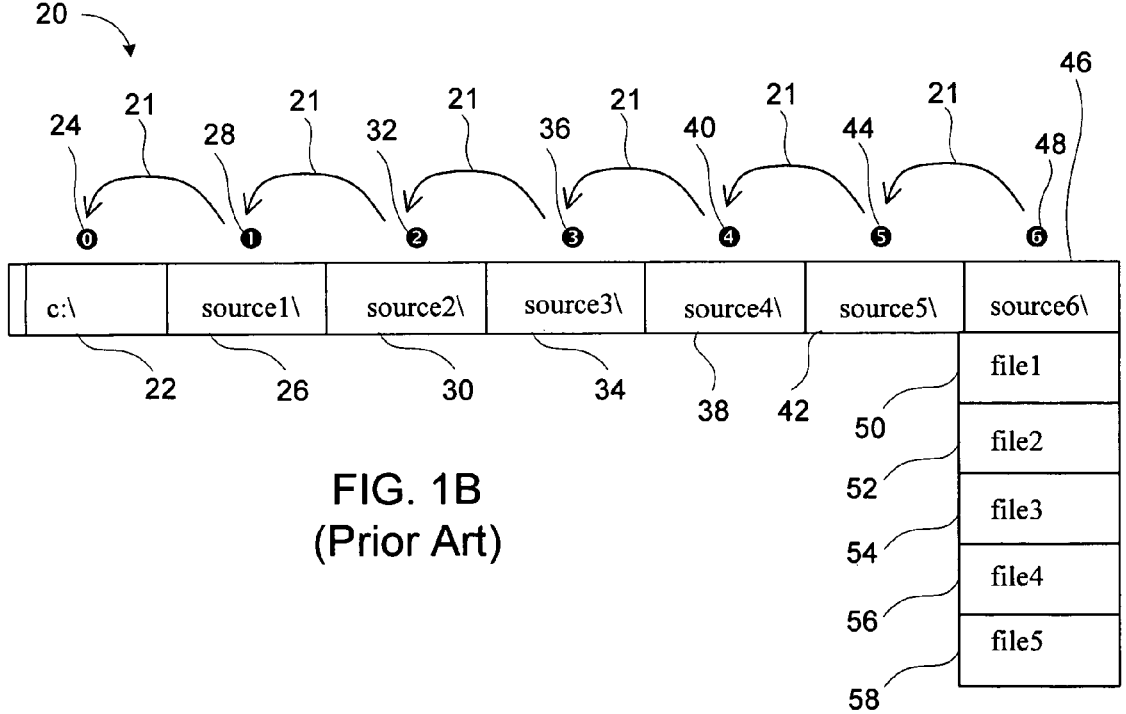
FIG. 1B
(Prior Art)
FIG. 1C
(Prior Art)

METHOD AND SYSTEM FOR PROCESSING DATA SELECTED FOR RECORDING TO OPTICAL MEDIA

BACKGROUND OF THE INVENTION

1. Field of the Invention

The present invention relates generally to the recording of data onto optical media, and more specifically to a method for more efficiently processing data files selected for recording to an optical media.

2. Description of the Related Art

The storage of data to optical media has gradually, but steadily, increased in popularity and frequency of use. A typical consumer computer owner and operator counts a re-writable compact disc, or other optical media, drive among standard equipment for the home or office computer system. As the use of optical media continues to grow, so too does the demand for faster and less complicated recording applications and processes.

As is known, the process for recording data to an optical media generally includes the selection of data files to be recorded, also known as "burned," to an optical media, the processing of the files for recording, and the actual burning of the files to the target optical media. The recording speed of the selected data is effected by such variables as the quantity, size, and location of the selected files, the time required to process the selected data files for burning to a target optical media, and the write speed of the optical media recording device selected for the burn.

In pursuing efforts to increase the speed of recording to optical media, or decreasing the recording time, the quantity, size and location of selected files can be treated as constants, and hardware improvements are regularly improving the recording speed of optical media recording devices. The processing of data files for recording presents additional opportunities for developing faster recording to optical media while maintaining simplicity for ease of consumer use.

The prior art processing of files in preparation for burning to optical media consists generally of a plurality of process operations including such operations as the examination of selected data files, the creation of record data structures, the determination of a writing order, the creation of ordering data structures, the generation of a file system, and other such process operations to enable the locating of selected source files and burning of the files to a target optical media.

One of the plurality of process operations performed in the preparation of selected files to be burned to optical media is the generation of the file system. Typically, the generating of the file system includes the mapping of the source path of each of the files selected to be burned to an optical media, in addition to a plurality of process operations completed to place each of the selected files onto the target optical media. All files to be burned to an optical media are entered into a database. This database calls a source path from a path table or path tree configured to contain a file source path for each of the files selected to be recorded. During a typical recording process, the processing of the files in preparation for the burn includes the verification of each of the selected files to ensure that they exist in the location identified, that they can be opened, that they are the size that they have been identified to be, and other such verification processes. Each file in the constructed database is verified, and as each file is verified, the database calls the path tree or path table to locate a selected file at its source using the stored source path.

FIG. 1A shows a block diagram 10 of this single process of calling the source path. A database 12 is constructed during the processing of the files selected for recording to an optical media in preparation for the burn. The database 12 includes, for example, the source file name, location, size, type, and other such identifying data. The processing operations include, for example, the verification of the selected files in which the general integrity of the files is verified in preparation for burning the files to a target media. As each file is verified, the database 12 calls the path tree 14 to obtain the source path for the selected file.

Prior art processing is typically configured to conserve memory. Often, the conservation of memory resources is at the cost of performance. In the example of the processing of data files in preparation to burn to a target optical media, the conservation is exemplified in the manner in which the path tree 14 stores and retrieves source paths of files. Each time a source file is stored to the path tree 14, a short-hand or key is used to identify each node of the source path. FIG. 1B shows a block diagram of an exemplary source path 20 with nodes identified by keys 0–6. In FIG. 1B, a source path that is on root c:\ is shown. The root, c:\, is shown in block 22 and is identified as node 0 at 24. In the exemplary source path 20, each node is a directory that can be traced back to root c:\ at node 0, 24. By way of example, file2 in block 52 is in the directory source6 in block 46. The directory source6 is identified as node 6 at 48. As can be seen, source6 in block 46, is a sub-directory of source5 in block 42, which is a sub-directory of source4 in block 38, which is a sub-directory of source3 in block 34, and so forth back to the root, c:\ in block 22. Each of directories source1 at 26, source2 at 30, source3 at 34, source4 at 38, source5 at 42, and source6 at 46, can contain any number of files or additional sub-directories. Each directory is shown in FIG. 1B as being identified as a node. By following arrows 21, each node can be traced back to its parent, and eventually to the root, c:\ at 22. An exemplary path for file2 in block 52 is therefore file2 in block 52 at node 6, 48, which is traced to node 5 at 44, which is traced to node 4 at 40, which is traced to node 3 at 36, which is traced to node 2 at 32, which is traced to node 1 at 28 and back to the root at node 0, 24. A typical path statement for file2 at block 52 would be: c:\source1\source2\source3\source4\source5\source6\file2. A short-hand path notation for the same file might instead be: 6\file2, where it is known that "6" represents node 6 at 48, and the key for identifying node 6, 48, is known or identified in the path tree 14 (see FIG. 1A).

When files are processed during preparation for burning to optical media, the use of nodes in source paths conserves memory by utilizing a short-hand notation instead of the complete source path. FIG. 1C shows a typical source path 52a for file2 at 52 as described above in reference to FIG. 1B. The illustrated source path 52a identifies file2 at 52 as a file in the directory at node 6, 48. In order to verify file2 at 52, however, the entire source path must be identified in order to verify a correct source path for the file, and to locate and verify the file as described above. The source path 52a therefore calls "get(6)" to return the source path to the last node before the file, and then adds the file, file2 at 52, to the node. The prior art convention of storing the source paths using short-hand notation traces the file from the first identified node to the root. In the instant example, the returned path might look like: 6→5→4→3→2→1→0, where the returned source path traces through each node back to the root. Because the path tree has stored the key for each of the identified nodes, the complete source path is provided. Further, because each path for each of the files in the database 12 (FIG. 1A) is stored in short-hand notation as illustrated, memory is conserved.

As stated above, the conservation of memory is often at the expense of performance. In the instant example, although memory is saved in the use of the illustrated short-hand notation, each time a file is processed, the path is traced back through each identified node to the root. If a file is close to the root, the processing speed is only minimally impacted as the tracing is through minimal nodes. In the case of files that are located deep within a directory's hierarchy, however, the processing is more complex as files are traced through more and more nodes. When the number of files being processed is great, performance degradation is compounded. A typical recording operation to optical media can include hundreds, even thousands, of files, and processing performance in the manner as just described can be significantly impacted.

In view of the foregoing, what is needed is a method for processing files in preparation for burning to optical media that quickly and accurately identifies the selected file source paths without significantly degrading system performance. The method should be able to be implemented in existing applications, and should be configured to provide a consumer with fast and efficient file processing of selected files for burning to optical media without requiring specialized knowledge or skill on the part of the consumer.

SUMMARY OF THE INVENTION

Broadly speaking, the present invention fills these needs by providing a method for processing data to be recorded to optical media. The present invention can be implemented in numerous ways, including as a process, an apparatus, a system, a device, a method, or a computer readable media. Several embodiments of the present invention are described below.

In one embodiment, a method for processing data to be recorded to optical media is disclosed. The method includes receiving a request to record data to optical media, and then mapping a source path for the data. The source path is saved to a database. The source path includes a complete path from a root directory to a file location of the data, and the source path is retrieved to record the data to optical media. The source path is retrieved in a single step.

In another embodiment, a computer implemented method for processing data to be written to an optical media is disclosed. The computer implemented method includes identifying files selected for writing to the optical media, and then for each identified file, determining whether the identified file has been previously written to the optical media. If the identified file has been previously written, the computer implemented method copies the file path for the previously written file to a file database. If the identified file has not been previously written to the optical media, the computer implemented method determines whether a parent directory of the identified file has been previously mapped to a source path of the parent directory. The mapping of the parent directory is used to generate a file source path for the identified file if the parent directory has been previously mapped. Otherwise, the source path for the identified file is traced to the source. Any previously mapped parent directory between the identified file and the source is used, if available, to generate the file source path for the identified file. The file source path is saved to the file database, and the identified files are written to the optical media using the file database.

In still a further embodiment, a computer readable media having program instructions for recording data to optical media is disclosed. The computer readable media includes program instructions for identifying a list of files to be recorded and then mapping a source path for each file in the list of files. The source path for each file begins with a root drive and traces a file path from the root drive to the file including any intermediate directories. The source path is saved to a file system database, and further program instructions are disclosed which retrieve the source path for each file in the list of files in order to record the data to optical media.

The advantages of the present invention are numerous. One notable benefit and advantage of the invention is that recording speed and efficiency are greatly improved making the recording of data files to optical media a faster and more efficient task for the average consumer. By saving a complete file source path from root to selected file for each file selected for recording to optical media, fewer system resources are required to process and record data to optical media. The complete file source path is retrieved in a single step, thereby eliminating the resource intensive tracing of each source path node when processing and recording each file. In accordance with the present invention, the complete file source path is returned in a single step when the path is called for each selected file.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

FIG. 1A shows a block diagram of the single process of calling the source path according to the prior art.

FIG. 1B shows a block diagram of an exemplary source path with nodes identified by keys 0–6 according to the prior art.

FIG. 1C shows a typical source path for file2 as described in reference to FIG. 1B according to the prior art.

DETAILED DESCRIPTION OF THE PREFERRED EMBODIMENTS

An invention for processing data in preparation for recording to optical media is disclosed. In preferred embodiments, a computer implemented method is provided which includes saving file source paths as complete path statements from the root drive or directory to the selected file or files for recording to optical media. The complete source path is then retrieved in a single step for processing and recording without repeated and successive tracing back through intermediate parent directories to the root drive or directory. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 2:
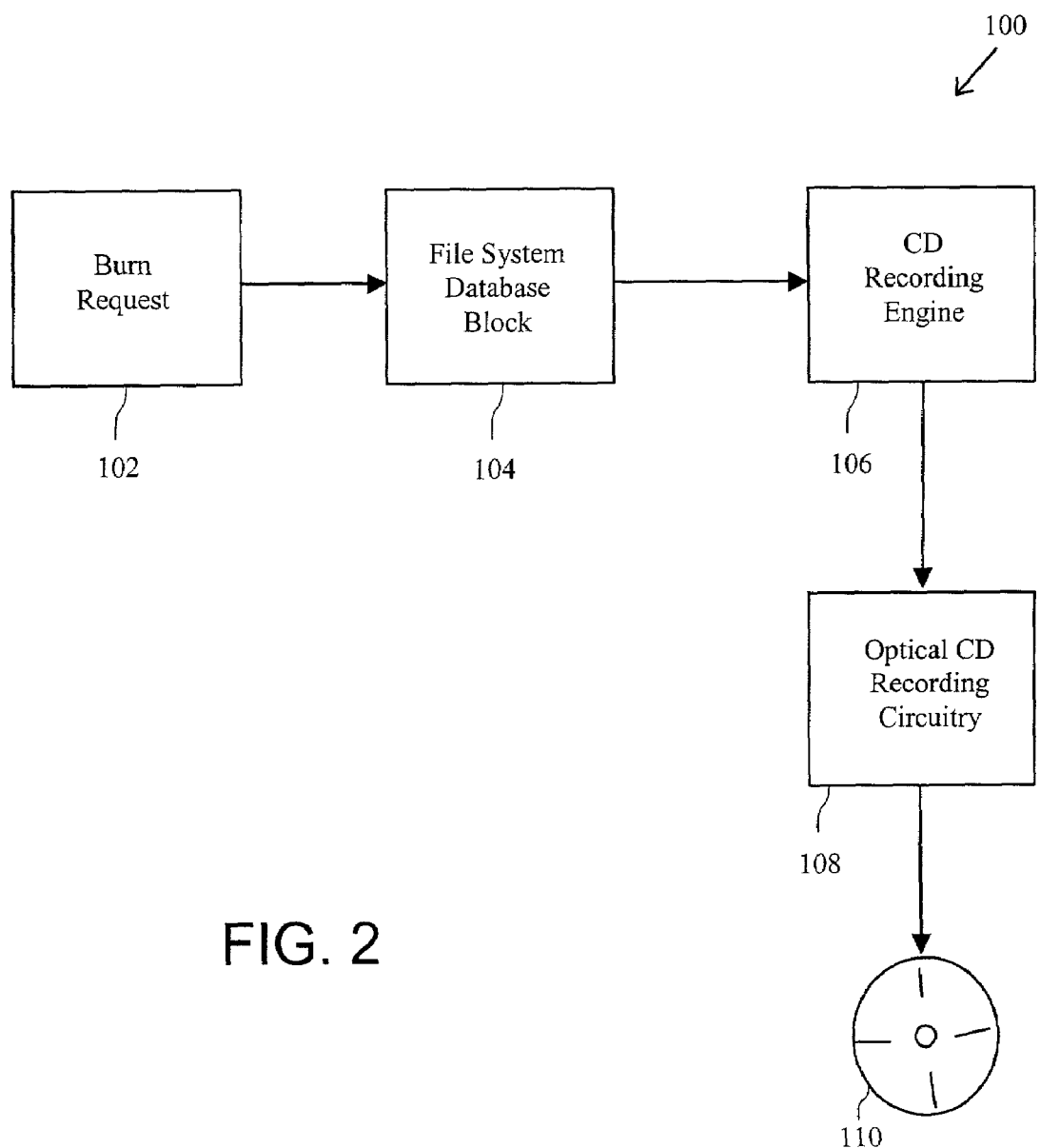
FIG. 2 illustrates a block diagram of the primary operations in preparing data files to be written to an optical media in accordance with one embodiment of the present invention.

FIG. 2 illustrates a block diagram 100 of the primary operations in preparing data files to be written to an optical media in accordance with one embodiment of the present invention. The method is applicable to writing data files to any type of optical media (e.g., CD-R discs, CD-RW discs, mini-discs, DVD discs, etc.), and is illustrated by way of example using a common compact disc (CD). The selection of data files to be recorded to CD initiates a burn request 102. The selection of files can be accomplished in any number of ways including, for example, operator input into the system through the graphical user interface (e.g., dragging a set of files to a CD device icon on a computer monitor), or executing a CD read/write software application and in response to a scripted set of queries, the operator selecting a group of one or more data files to be written to a CD optical disc. The burn request 102 is the selection and identification of a group of one or more data files to be copied from their source and written to a CD optical disc.

Once the burn request 102 has been initiated, a file system database block 104 is generated. The file system database block performs a number of file processing operations to map out source locations of each of the files, to sequence the selected files in a recording order, to determine which files will be sent to system cache during the recording operation, to generate pointers and data structures which are passed to the CD recording engine 106, and other file processing operations in preparation for the writing or burning of the selected data files to a target optical media 110. The CD recording engine 106 then reads the selected files in the writing order into the optical CD recording circuitry 108. The optical CD recording circuitry 108 performs the actual writing or burning of the data files to the optical media 110.

In the file system database block 104, the data files are examined and processed in order to prepare for the selected data files to be recorded on to the CD. Several discrete operations occur in the processing of the data files as will be discussed in greater detail below. The file system database block 104 encompasses those various operations that are performed to prepare selected data to be burned to a CD. In one embodiment, the file system database block 104 is a collection of sub-routines or other computer code that functions to manipulate the selected data files, performing functions as described below in the execution of the software application code that records data to an optical media.

In one embodiment, the processing includes examining each of the data files selected for recording to CD and verifying the source location of the file, the file size, the integrity of the file, and other file attributes to enable the writing of the source data file to a destination CD. In order to verify the source file, and in order to enable the CD recording engine 106 to locate and read the file, the file system database block 104 generates a source path for each selected data file. As described in reference to FIG. 1A, a file system database 12 is generated containing a source path for each of the files selected for recording. In one embodiment, the source path contained in the file system database 12 is recorded using abbreviated or short-hand notation. A path tree 14 is created to contain a key associated with each of the file path abbreviations used in the database 12.

Figure 3:
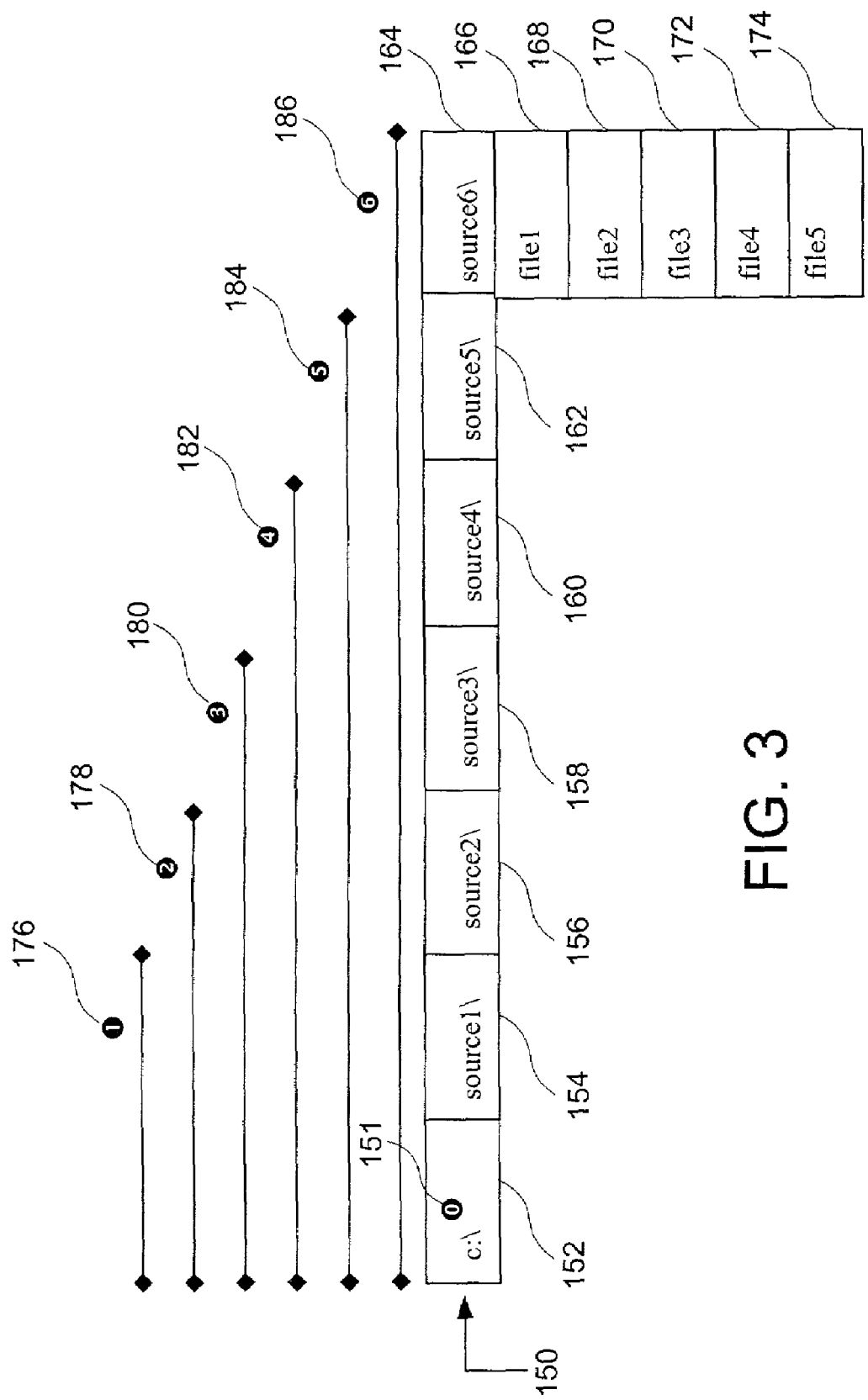
FIG. 3 shows a block diagram of an exemplary directory tree in accordance with one embodiment of the invention.

FIG. 3 shows a block diagram 150 of an exemplary directory tree in accordance with one embodiment of the invention. In the block diagram 150, nodes 1–6 are identified, and exemplary source paths are easily traced. The root drive or directory, c:\, is shown in block 152. The drive designator, c:\, is exemplary only, and as is known, the root can be any of identified drives, also called root directories, integral or connected to a computer system. Node 0 at 151, is root c:\. The simple directory tree shown in block diagram 150 includes six directories in a single branch, and five files in the sixth directory, source6 at 164. As described in reference to FIG. 1B, each directory defines a node of the directory tree. In one embodiment of the present invention, each directory defines a terminal point of a node of the directory tree In FIG. 3, source1 at 154 defines the terminal point of node 1 at 176, source2 at 156 defines the terminal point of node 2 at 178, source3 at 158 defines the terminal point of node 3 at 180, source 4 at 160 defines the terminal point of node 4 at 182, source5 at 162 defines the terminal point of node 5 at 184, and source6 at 164 defines the terminal point of node 6 at 186. Each of nodes 1–6 begins at root c:\, 152. In this manner, a call to retrieve any node is independent of any other node in the directory tree. Unlike the prior art which traced a directory tree through each node from a source file back to the root for the source file, one embodiment of the present invention defines each node from the root, and therefore returns a complete file path from the root to the terminal directory for each node called.

In FIG. 3, file2 at 168 is used to illustrate one embodiment of the present invention. As can be seen in FIG. 3, file2 at 168 is a file in directory source6 at 164. Source6 at 164 is the terminal directory of node 6 at 186. If file2 at 168 were to be selected for burning to optical media, a database entry might list the source path for file2 at 168 as, <path>=get( 6 )\file2. In the path tree, node 6, 186, is defined as the entire path from the root to the terminal directory, or in the instant example, c:\source1\source2\source3\source4\source5\source6. File2 at 168 is simply added on to the source path as a file in directory source6 at 164, the terminal directory of node 6 at 186.

Each of the illustrated directories, source1 at 154 through source6 at 164, can contain one or more files, as well as one or more sub-directories. Additionally, each sub-directory can contain one or more files in addition to one or more sub-directories. As is known, file structures can range from the very simple to the extremely complex. In one embodiment of the present invention, when a file that has been selected to be recorded to optical media is being processed, the parent of the selected file is identified. If a node has been defined with the identified parent as the terminal directory, the selected file is simply added to the previously defined node that terminates with the identified parent directory. If a node that terminates with the identified parent has not been previously defined in the recording operation, a new node is identified that starts with the root and terminates with the identified parent directory. The entire file path is included in the node key which is stored in the path tree. When file processing operations call the source path for the selected file, the source path from root to parent is called in a single step, with the selected file contained in the parent directory that terminates the node.

From the above example, it should be appreciated that simple file and directory structures, and source files that are relatively close to the root, will realize a smaller increment of gain in processing speed over prior art than complex file and directory structures, and in particular, those files found deep within a directory hierarchy. In one embodiment of the invention, the file database 12 (See FIG. 1A) appears comparable to the file database of prior art with selected files identified by path statements calling a node identifier or short-hand notation, to get the parent of the selected file, and then the selected file added to the node indicating the selected file is contained in the parent directory terminating the called node. The path tree 14 (See FIG. 1A) can be a larger structure than in prior art since nodes are identified by the complete file path from root to terminal directory. A call for a node, or source path, returns the file path in one step rather than tracing through each intermediate parent directory from the parent of the selected file back to the root. In one embodiment, the additional memory required for the larger structure is minimal, but the increase in processing speed can be significant.

Figure 4:
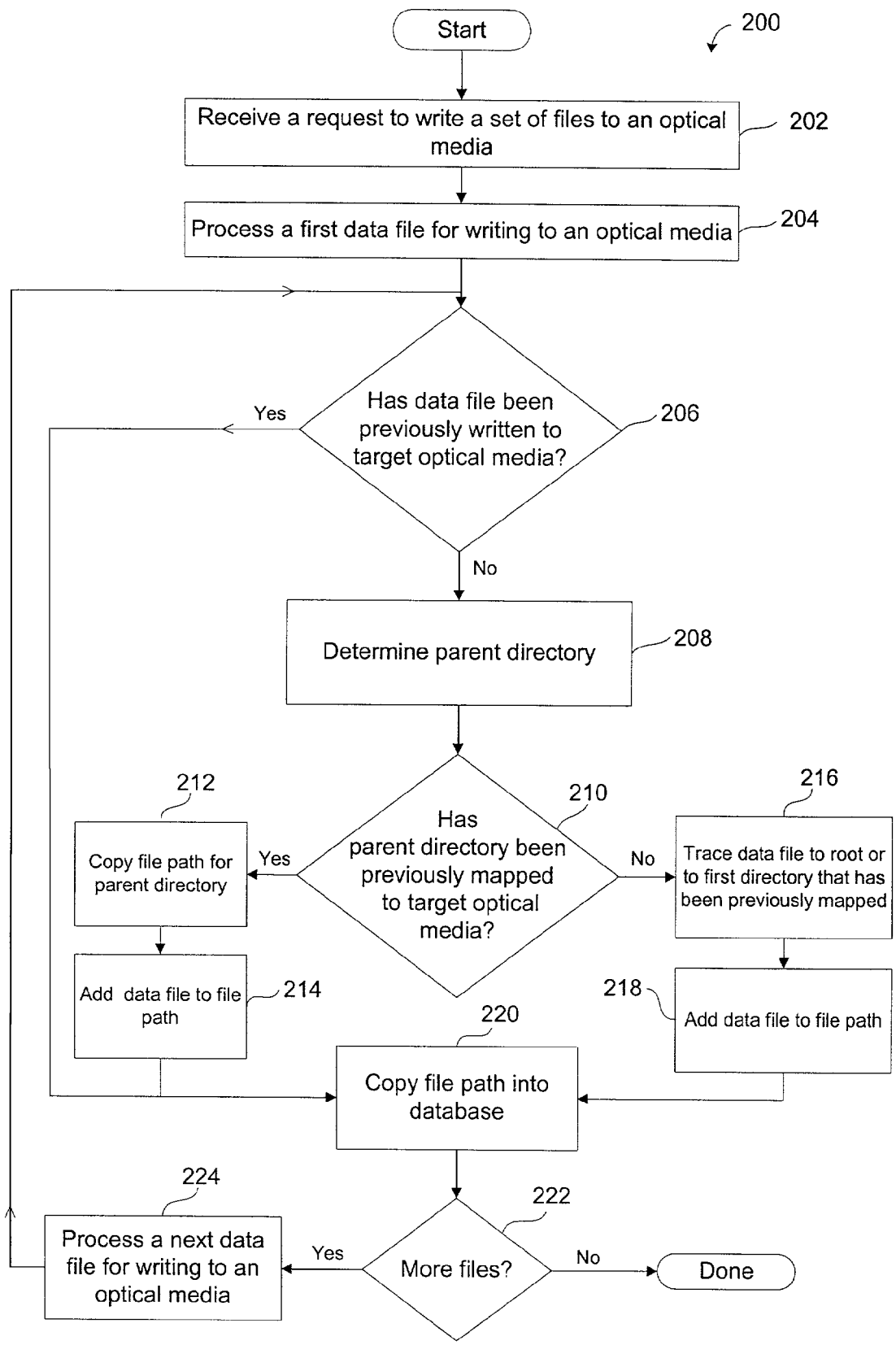
FIG. 4 shows a flow chart diagram illustrating the method operations performed for rapid processing of files to burn to an optical media in accordance with one embodiment of the present invention.

FIG. 4 shows a flow chart diagram 200 illustrating the method operations performed for rapid processing of files to burn to an optical media in accordance with one embodiment of the present invention. The method begins with operation 202 in which a request is received to write a set of files to an optical media. This operation is also known as a burn request. In one embodiment the burn request is received when files are selected, a target optical media recording device is identified, and a command to copy, move, record, burn, or otherwise write a selected file or files from a source location to a destination optical media is executed.

Once the burn request has been received, the method continues with operation 204 in which a first data file is processed for writing to an optical media. As described above in reference to FIG. 2, the selected files are processed through a plurality of operations in preparation for recording to an optical media. In some applications, several of the processing operations are grouped or combined for efficiency, and the sequence in which many of the processing operations are performed can vary according to the program or application utilized to accomplish the recording of the selected files to the destination optical media. Typically, each of the selected files are processed through a plurality of operations in preparation for recording to optical media. One of the operations is the identification and mapping of a source path, and the saving of the source path to a file database. In one embodiment of the present invention, the source path mapping is a discrete operation performed one file at a time until all files have been saved to the database.

In operation 204, a first file is processed for writing to an optical media. In one embodiment, the processing in operation 204 is the receiving of the first file to map and save the source path. Once the file has been received, the method proceeds with decision block 206 in which it is determined if the file has been previously written to the target optical media. In some recording operations, multiple copies of the same file are selected to be recorded. In other operations, the same file may have been modified so that the data contained within the file has changed since an earlier or previous selection and writing to the target optical media. In decision block 206, it is simply verified whether the same file has been previously written to the destination or target optical media. If so, a "yes" to decision block 206, the method advances to operation 220 in which the file path is copied into the database. Operation 220 is discussed in greater detail to follow. If the file has not previously been written to the destination optical media, a "no" to decision block 206, the method advances to operation 208.

In operation 208, the parent directory of the selected file is determined. As is known, any directory can contain a plurality of files, and the determination of a source path for any file is the tracing of a file through its parent, and any subsequent parent directories to its root.

The method next continues with decision block 210 in which it is determined whether or not the parent directory has been previously mapped to the destination or target optical media. If so, a "yes" to decision block 210, the method proceeds with operation 212 in which the file path for the parent directory is copied. The method next adds the data file to the file path in operation 214. In one embodiment, the file path for the parent directory that is copied in operation 212 is an abbreviation or short-hand notation for a node identifier. As illustrated in FIG. 3, a short-hand identifier for a node notation might be a numeric identifier. In another embodiment, the identifier might be an alpha-numeric notation, and in yet another embodiment, the identifier is noted in machine code. If the source path of the parent directory has been previously identified and saved as a node, the parent directory of the file being processed terminates the node. When the file is added to the abbreviated or short-hand node notation corresponding to the file path of the parent directory in operation 214, the resulting file source path indicates the selected file being processed is located in the parent directory that terminates the previously identified node.

Following the adding of the data file to the copied file path in operation 214, the method continues with operation 220 in which the complete file path is saved to the file database. In one embodiment, the saving of the complete file path is in short-hand or abbreviated notation as described above. It should be noted that the previously mapped file path terminating with the parent directory that is identified with an abbreviated or short-hand notation node identifier is saved in the path tree. In one embodiment, the complete path beginning with the root and terminating with the parent directory is saved under a key in the path tree corresponding to the node identifier. Therefore, a path in the file database described with a node identifier and the selected file, is returned with a complete source path from the path tree.

If the parent directory of the selected file, the file currently being processed, has not been previously mapped to the target or destination optical media, a "no" to decision block 210, the method advances to operation 216. In operation 216, the source path to the root, or to the first previously identified and mapped node, whichever comes first, is traced. In one embodiment of the present invention, a node starts with the root, and terminates with the parent directory of the selected file being processed. If the tracing of the file path arrives first at a previously identified node, the remaining path to the root is saved under the key corresponding node identifier in the path tree and is called to complete the path. If the tracing continues without reaching a previously identified node all the way to the root, no previously defined node is called, and in either case, the traced source path from the root and terminating with the parent directory defines a new node. In another embodiment, if it is determined the parent directory has not been previously identified and mapped, the source is traced all the way to the root whether or not previously identified nodes are encountered.

In one embodiment, the tracing of the source path in operation 216 includes the identification of the source path from the root drive or directory and terminating in the parent directory as a node. The complete source path is assigned a node identifier for short-hand or abbreviated notation, and saved under the corresponding key in the path tree. Once the path has been traced, and the complete source path saved in the path tree, the method continues with operation 218 in which the selected data file, the file currently being processed, is added to the file path. The method then continues with operation 220 in which the file path is copied into the database. In one embodiment, the copied file path includes the short-hand or abbreviated node identifier and the selected file.

Following operation 220 in which the file path is copied into the database, and previous operations in which complete source paths have been saved to the path tree, the method advances to decision block 222 where it is determined if there are more files to process. In the instant example, the method has been illustrated with a first data file for recording to optical media. If there are more files selected for recording to the target or destination optical media, a "yes" to decision block 222, the method advances through operation 224 in which the next data file is processed for writing to optical media, and loops back to decision block 206 where it is determined if the next data file has been previously written to the target or destination optical media. The method is then repeated as described above for the first data file. In operation 224, as described for operation 204, the processing of the next data file includes receiving a next data file for mapping and saving a source path. The method repeats as described for each of the data files selected to be written to a target or destination optical media. Once all of the files have been processed, a "no" to decision block 222, the method is done.

In accordance with one embodiment of the present invention, following the processing of each of the files selected for burning to a target or destination optical media, a file source path for each of the selected files is saved for each file in a file database. The file database includes a source path in an abbreviated or short-hand notation. A file path tree contains a key associated with the abbreviated or short-hand notation which returns the complete source path from a root drive or directory to the selected file. In this manner, the retrieval of the source path of a selected file during the burning of the selected file to a destination or target optical media, is a one-step operation without additional processing time and resources dedicated to tracing a file through each source path node to a root.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for processing data to be recorded to optical media, comprising:
   receiving a request to record data to optical media;
   mapping a source path for the data if the file path has not been previously mapped or associating the data to be written with the path which has been previously mapped, wherein the source path includes a complete path from a root directory to a file location of the data, the file location being a source location of the data from where the data is read and is to be recorded to a destination optical media;
   saving the source path for the data to a file system database for efficiently processing data selected to be recorded to the optical media; and
   retrieving the source path from the file system database in a single step without successive tracing to the root directory to record the data to optical media.

2. A method for processing data to be recorded to optical media as recited in claim 1, wherein saving the source path to the file system database includes identifying a node of the source path, the node being a part of the source path from the root directory to a parent directory of the data to be recorded to optical media.

3. A method for processing data to be recorded to optical media as recited in claim 2, wherein a node identifier corresponds to the source path of the node.

4. A method for processing data to be recorded to optical media as recited in claim 3, wherein the node identifier is saved to the file system database and the corresponding source path from the root to the parent directory of the node is saved to a path tree.

5. A computer implemented method for processing data to be written to an optical media, the computer implemented method comprising:
   identifying files selected for writing to the optical media;
   for each identified file, the method includes,
      determining whether the identified file has been previously written to the optical media, and if previously written, the method moves to copy a file paths including a complete path from a root directory to a file location of the data, for the previously written file to a file system database to be used for writing the identified file to the optical media; and
      if the identified file has not been previously written to the optical media, the method includes,
         determining whether a parent directory of the identified file has been previously mapped to a source path, which includes a complete path from a root directory to the parent directory;
         using the mapping of the parent directory to generate a file source path for the identified file to be written to the optical media if the parent directory has been previously mapped, otherwise, tracing a file source path for the identified file to a root directory through any intervening parent directories to the identified file and using any previously mapped parent directory if available to generate the file source path for the identified file;

saving the file source path to the file system database to be used for efficiently processing and writing the identified file to the optical media; and writing the identified files to the optical media using the file system database, wherein the file source path identifies a source location of the identified file and can be retrieved from the file system database in a single step without successive tracing to the root directory at the time of writing to the optical media, from which the identified file is read to be written to a destination optical media.

6. A computer implemented method for processing data to be written to an optical media as recited in claim 5, wherein saving the file source path to the file system database includes identifying a node of the file source path, the node being a part of the file source path from the root drive to the parent directory of the identified file.

7. A computer implemented method for processing data to be written to an optical media as recited in claim 6, wherein a node identifier corresponds to the source path of the node.

8. A computer implemented method for processing data to be written to an optical media as recited in claim 7, wherein the node identifier is saved to the file system database and the corresponding source path from the root drive to the parent directory of the node is saved to a path tree.

9. A computer readable media having program instructions for recording data to optical media, the computer readable media comprising:

program instructions for identifying a list of files to be recorded;

program instructions for mapping a source path for each file in the list of files if the source path has not been previously mapped or associating a file to be written with the source path which has been previously mapped, the source path for each file beginning with a root drive and tracing a file path from the root drive to the file including any intermediate directories;

program instructions for saving the source path to a file system database for efficiently processing files identified to be recorded to the optical media; and program instructions for retrieving the source path for each file in the list of files includes obtaining a complete source path for each file from the root drive to each file in a single step without successive tracing to the root directory to record the data to optical media, wherein the source path identifies a source location from which each file in the list of files is read to be recorded to a destination optical media.

10. A computer readable media having program instructions for recording data to optical media as recited in claim 9, wherein saving the source path to the file system database includes identifying a node of the source path, the node being a part of the source path from the root drive to a parent directory of each file to be recorded to optical media.

11. A computer readable media having program instructions for recording data to optical media as recited in claim 10, wherein a node identifier corresponds to the source path of the node.

12. A computer readable media having program instructions for recording data to optical media as recited in claim 11, wherein the node identifier is saved to the file system database and the corresponding source path from the root drive to the parent directory of the node is saved to a path tree.

* * * * *